Patented Dec. 17, 1946

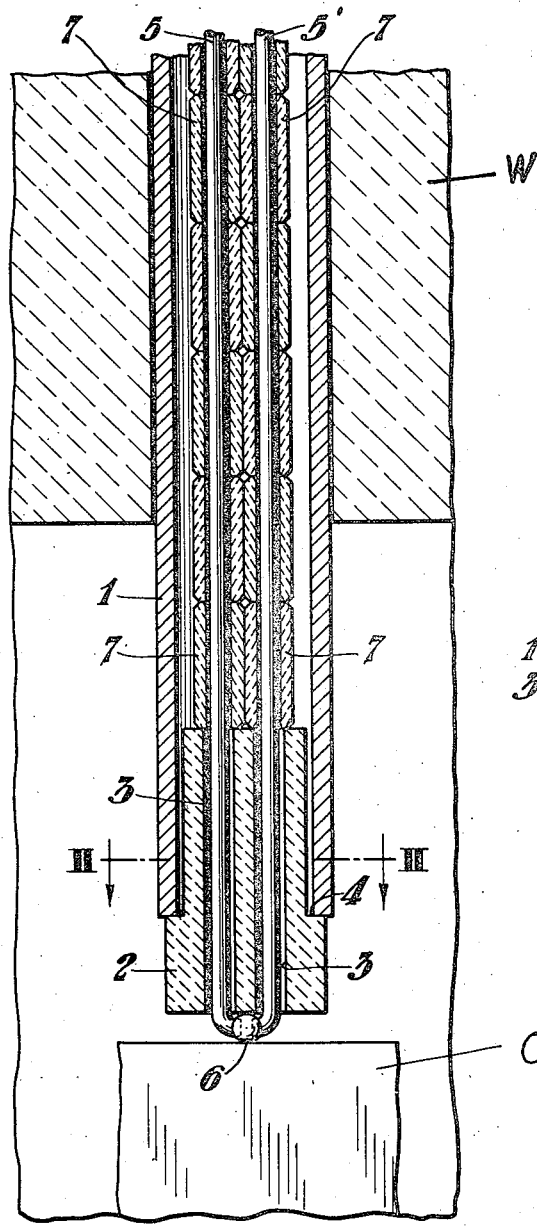

2,412,564

UNITED STATES PATENT OFFICE 2,412,564

HEAT MEASURING APPARATUS

Farmer Lee Current, South Charleston, W. Va., assignor to Carnegie-Illinois Steel Corporation, a corporation of New Jersey Application July 7, 1943, Serial No. 493,781

1 Claim. (Cl. 136—4)

This invention relates to heat measuring apparatus, and is particularly concerned with apparatus of the type incorporating a metal carrier for a heat measuring device, the object being to prevent inaccurate measurements resulting from too rapid exchange of heat between the carrier and the heat measuring device.

A specific example of apparatus, embodying the principles of the invention, is illustrated by the accompanying drawing in which:

Figure 1 is a longitudinal section; and

Figure 2 is a cross section from the line II—II in Figure 1.

More specifically, the drawing shows a metal pipe 1 of sufficient length to be passed through an opening in a furnace wall W so as to bring one end adjacent an object O being heated therein, this use requiring the pipe to be solid-walled, while its other end remains outside the furnace. The inside end of this pipe carries a non-metallic, refractory bushing 2 having longitudinally extending holes 3, this bushing having a shoulder 4 engaging the pipe end and being suitably retained in the pipe end. Unlike metal wires 5 and 5' extend longitudinally through the pipe and through the holes 3, in the bushing 2, their ends being electrically interconnected, as by a weld 6, on the outside of the bushing 2. Non-metallic, refractory material 7, in the form of beads, covers the wires 5 and 5' between the inside end of the bushing 2 and the opposite end of the pipe, from which they exit.

In use, the pipe 1 is positioned through the furnace wall and into the furnace so as to bring the hot junction, provided by the weld 6, of the thermocouple, provided by the unlike metal wires 5 and 5', into contact with an object being heated in the furnace. The bushing 2 is constructed to provide sufficient spacing between the hot junction, and the wires 5 and 5' themselves, respecting the metal pipe 1, to prevent rapid exchange of heat therebetween. Therefore, when the pipe 1 is heated to different temperatures than the object whose temperature is being measured, such as occurs when the pipe 1 is close to the furnace wall so that the pipe is at a lower temperature, or when it is near the center of the furnace when it may be at a higher temperature, inaccurate results are prevented, to a large extent, since the pipe 1 cannot conduct heat to or from either the hot junction 6 or the wires 5 and 5' with sufficient rapidity to cause trouble.

The pipe 1 may be ordinary black steel pipe, the wires 5 and 5' may be made of iron and constantan, the bushing 2 may be made of porcelain, and the beads 7 may be made of clay.

I claim:

A thermocouple assembly comprising the combination with a solid-walled metal pipe adapted to be inserted into a furnace, of a non-metallic refractory bushing fitted into an end of the said pipe with longitudinally extending holes therethrough, wires of dissimilar metal forming a thermocouple extending through the said pipe and the said holes with their ends electrically interconnected on the outside, an annular shoulder on the bushing in abutting engagement with the end of the said pipe and substantially covering the said end, the said bushing being spaced from the pipe interiorly thereof, for inhibiting transfer of heat from the bushing to the said pipe, the said bushing providing sufficient spacing between the said ends of the said wires and the end of the pipe to prevent rapid exchange of heat therebetween, and non-metallic refractory material covering the said wires between the inside end of the bushing and the opposite end of the pipe.

FARMER LEE CURRENT.